(12) United States Patent
Schroeder

(10) Patent No.: US 10,505,359 B2
(45) Date of Patent: Dec. 10, 2019

(54) ADAPTIVE ARC FAULT DETECTION TRIP DECISION BUFFER

(71) Applicant: SCHNEIDER ELECTRIC USA, INC., Schaumburg, IL (US)

(72) Inventor: Jeremy D. Schroeder, Urbana, IA (US)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 736 days.

(21) Appl. No.: 14/899,622

(22) PCT Filed: Jun. 27, 2013

(86) PCT No.: PCT/US2013/048074
§ 371 (c)(1),
(2) Date: Dec. 18, 2015

(87) PCT Pub. No.: WO2014/209311
PCT Pub. Date: Dec. 31, 2014

(65) Prior Publication Data
US 2016/0149389 A1 May 26, 2016

(51) Int. Cl.
*H02H 3/00* (2006.01)
*H02H 9/08* (2006.01)
*H02H 1/00* (2006.01)

(52) U.S. Cl.
CPC ........ *H02H 1/0092* (2013.01); *H02H 1/0015* (2013.01)

(58) Field of Classification Search
CPC .................................................. H02H 1/0092
(Continued)

(56) References Cited

U.S. PATENT DOCUMENTS 3,911,323 A * 10/1975 Wilson ............... H02H 3/04
340/650
6,970,936 B2 11/2005 Fields, Jr. et al.
(Continued)

FOREIGN PATENT DOCUMENTS

| CN | 1417913 A | 5/2003 |
| EP | 1598912 B1 | 10/2012 |
| RU | 117734 U1 | 6/2012 |

OTHER PUBLICATIONS

International Search Report and Written Opinion for PCT/US13/48074 dated Dec. 2, 2013, 16pp.
(Continued)

*Primary Examiner* — Thienvu V Tran
*Assistant Examiner* — Lucy M Thomas
(74) *Attorney, Agent, or Firm* — Locke Lord LLP

(57) ABSTRACT

An autonomous adaptive arc fault detection device includes a memory for storing data of arc fault tripping events detected on a circuit over a period of time. The device also includes a processor, in communication with the memory, for determining whether a newly detected arc fault tripping event is an unwanted tripping event based on a number of times a same type of tripping event, as the newly detected arc fault tripping event, has occurred, and inhibiting interruption of the circuit if the newly detected arc fault tripping event is determined to be an unwanted tripping event. The memory can store data, such as sensed or calculated electrical characteristic parameters defining a signature of a detected arc fault tripping event as well as a number of times a stored tripping event has occurred over a period of time.

20 Claims, 5 Drawing Sheets

(58) Field of Classification Search
USPC .................................................. 361/2, 42
See application file for complete search history.

(56) References Cited

U.S. PATENT DOCUMENTS

| | | |
|---|---|---|
| 7,345,860 B2 | 3/2008 | Wong |
| 8,089,737 B2 | 1/2012 | Parker et al. |
| 2001/0036047 A1 | 11/2001 | Macbeth et al. |
| 2004/0136124 A1 | 7/2004 | Engel et al. |
| 2006/0181816 A1 | 8/2006 | Pellon et al. |
| 2010/0157486 A1 | 6/2010 | Parker et al. |
| 2011/0031563 A1 | 2/2011 | Zhuang et al. |
| 2011/0249370 A1 | 10/2011 | Nayak et al. |
| 2011/0254557 A1* | 10/2011 | Makki ............... G01R 31/3274 324/418 |

OTHER PUBLICATIONS

Extended European Search Report for Application No. 13887825.1-1806 / 3014722 dated Feb. 1, 2017.
RU Office Action dated Jun. 22, 2017 for Russian Application No. 2015152791107(081323).
RU Search Report for Russian Application No. 2015152791/07(081323) completed Jun. 22, 2017.
1st Office Action for Chinese Patent Application No. 201380077820.4 dated Oct. 10, 2017.

* cited by examiner

ADAPTIVE ARC FAULT DETECTION TRIP DECISION BUFFER

FIELD

The present disclosure relates to the field of arc fault detection, and more particularly, to an approach for improving immunity against nuisance tripping in arc fault detection devices.

BACKGROUND

An arc fault detection device is used to detect hazardous arcing events on a circuit, and in response, to trip a circuit interrupter and remove power to the circuit. These detection devices include Branch Circuit, Outlet Circuit and Combination Arc Fault Circuit Interrupters (AFCIs).

Arc fault detection is a probability determination. Thus, an arc fault detection device may be subject to unwanted tripping, such as nuisance tripping or false positive tripping, which is an inconvenience to the user, or worse. Over the past decade, improvements have been made to detection algorithms used in arc fault detection devices in order to increase immunity against unwanted tripping. However, as time progresses, new unwanted tripping scenarios will likely appear that are not addressed by current detection algorithms. Given that an arc fault detection device is expected to have an installed lifetime of decades, it may encounter unforeseeable loads and load combinations over its life span, which may cause unwanted tripping.

SUMMARY

The present disclosure provides an adaptive arc fault detection device and method, which identifies and filters out unwanted arc fault tripping events (e.g., nuisance tripping or false positive tripping events) by storing and evaluating data of arc fault tripping events detected on a circuit over a period of time. The detection of an arc fault is a probabilistic determination. In other words, a hazardous arc fault is a random, chaotic event, and thus, a recurrent arc fault tripping event is likely (probably) an unwanted tripping event. Accordingly, the adaptive arc fault detection device and method can determine whether a detected arc fault tripping event is an unwanted tripping event based on a number of times that a same type of tripping event, as the detected arc fault tripping event, has occurred. When the detected arc fault tripping event is determined to be an unwanted tripping event, interruption of the circuit is inhibited. This adaptive detection approach addresses unforeseeable unwanted tripping and can be implemented without any human interaction to curtail nuisance tripping phenomena.

In a further embodiment, a memory is used to store the data of detected arc fault tripping events. The stored data can include sensed or calculated electrical characteristic parameters representing a signature of a detected arc fault tripping event (i.e., signature data). The stored data can also include a number of times a particular detected type of arc fault tripping event has occurred. The memory may store a limited number of tripping events. As a consequence, data of prior tripping events may be deleted from the memory as new tripping events are detected. The various benefits of this data storage scheme are discussed below.

BRIEF DESCRIPTION OF THE DRAWINGS

The description of the various exemplary embodiments is explained in conjunction with the appended drawings, in which.

DETAILED DESCRIPTION

In accordance with various disclosed embodiments, there is provided an adaptive arc fault detection device and method, which identifies and filters out unwanted arc fault tripping events, such as nuisance tripping or false positive tripping events.

Figure 1:
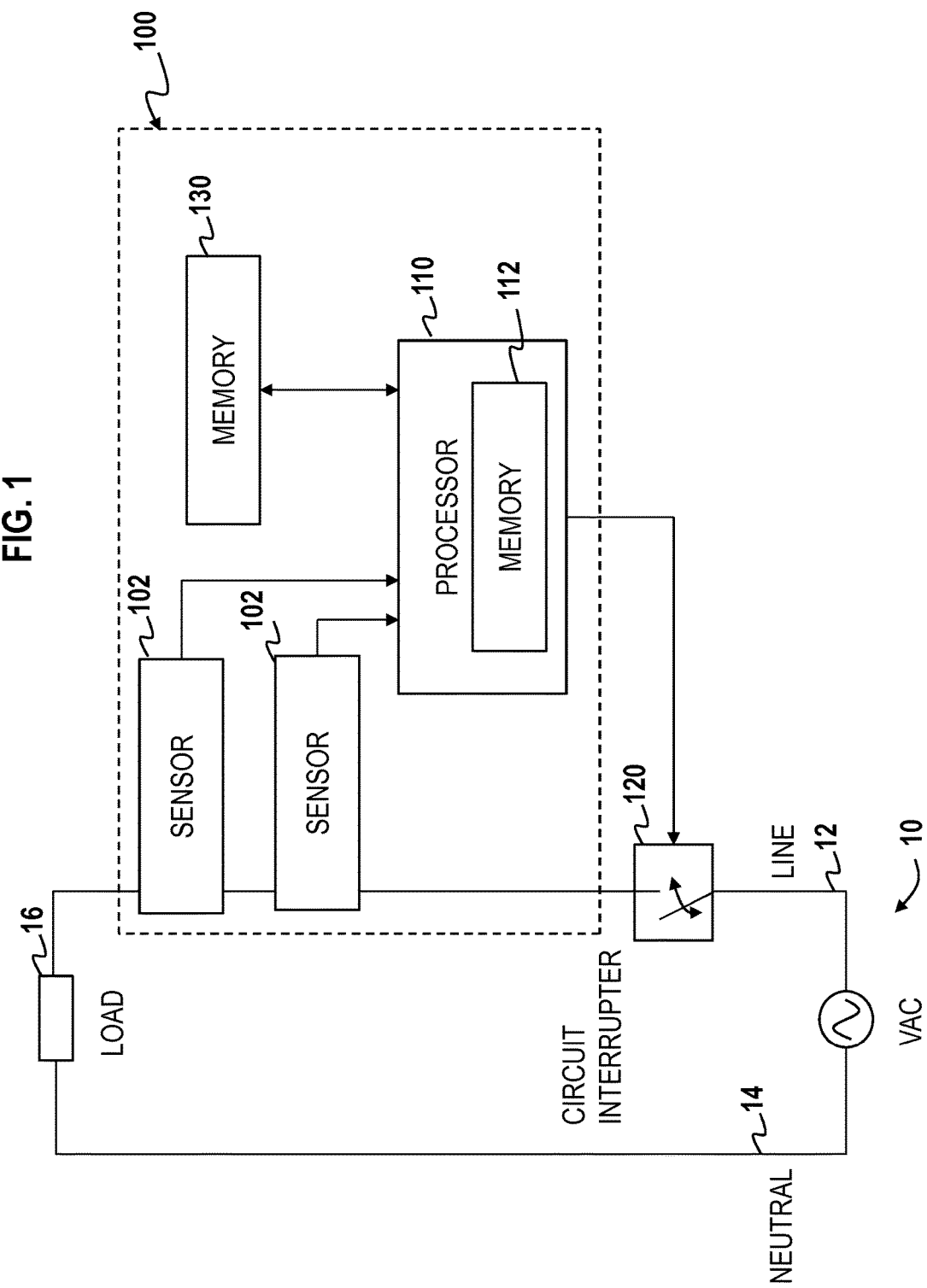
FIG. 1 illustrates a block diagram of an exemplary adaptive arc fault detection device in accordance with an embodiment of the present disclosure.

FIG. 1 illustrates a block diagram of an exemplary adaptive arc fault detection device 100. As shown in FIG. 1, the arc fault detection device 100 monitors the electrical characteristics on an AC circuit 10, and interrupts current to the circuit 10 via a circuit interrupter 120 in response to a detection of an arc fault tripping event. The circuit 10 includes a line conductor 12, a neutral 14 and a load 16. The load across the circuit 10 may vary depending on what devices are connected to the circuit 10. The circuit interrupter 120, such as the separable contacts of a breaker, can include a trip solenoid and a latch.

The arc fault detection device 100 includes a plurality of sensors 102, a processor 110 including an internal memory 112, and a memory 130. The device 100 may draw power from the circuit 10 and employ a backup power source, such as a battery (not shown). The arc fault detection device 100 may be any type of AFCI.

The sensors 102 monitor or sense electrical characteristics of the circuit 10 and the load 16, and output signals to the processor 110. The electrical characteristics can include a voltage, high frequency content, current or rate of change of the current (di/dt) through the circuit 10. The sensors 102 may also include, or be connected to, signal conditioning circuits, threshold detectors, filters and analog-to digital converters for processing the sensed data prior to output to the processor 110.

The processor 110 is in communication with the memory 112 and memory 130. The processor 110 is a processing system, such as a microcontroller(s) or a microprocessor(s), which controls the operations of the arc fault detection device 100. For example, the processor 110 determines whether a detected arc fault tripping event on the circuit 10 is an unwanted tripping event based on a number of times a same type of tripping event, as the detected arc fault tripping event, has occurred. When the detected arc fault tripping event is determined to be an unwanted tripping event, the processor 110 inhibits the circuit interrupter 120 from interrupting current to the circuit 10. Otherwise, the processor 110 allows the circuit interrupter 120 to interrupt current to the circuit 10.

The memory 112 and memory 130 (referred collectively as "memory") store computer executable code or programs, which when executed by the processor 110, controls the operations of the arc fault detection device 100. The memory also includes a trip decision buffer, as part of memory 112 or separately, that stores data items of detected arc fault tripping events, and may be a first-in-first-out (FIFO) buffer. The data item for a tripping event may include an identifier for the event, a time stamp of the event, one or more sensed or calculated electrical characteristic parameters that define a signature of the event (e.g., signature data), a match variable identifying a number of times the event-type has occurred or other event related parameters. The storage space allocated to the trip decision buffer may be limited to a predefined number of data items. As a result, when the buffer is full, a data item is removed (or deleted) from the trip buffer to allow storage of a new data item. The removed data item can be an oldest data item of a tripping event, a data item of an oldest tripping event, or a data item of a tripping event with the least matches. The memory may be a volatile or non-volatile memory.

The trip decision buffer provides a number of benefits. First, any detected arc fault tripping event is always interrupted at least a first time to provide protection and notice to the user, regardless of whether the tripping event is hazardous. Unwanted tripping becomes an inconvenience only when it persists. Eventually, the arc fault detection device 100, in combination with the trip decision buffer, will inhibit circuit interruption due to tripping events that are not hazardous. Second, if the trip decision buffer stores a finite number of data items, a hazardous tripping event stored in the buffer will eventually be removed from the buffer as new tripping events are detected and stored. In this way, the arc fault detection device 100 will interrupt the circuit 10 if the hazardous event is detected again in the future. Various exemplary data storage implementations are discussed in further detail below with reference to FIGS. 3 through 5.

Figure 2:
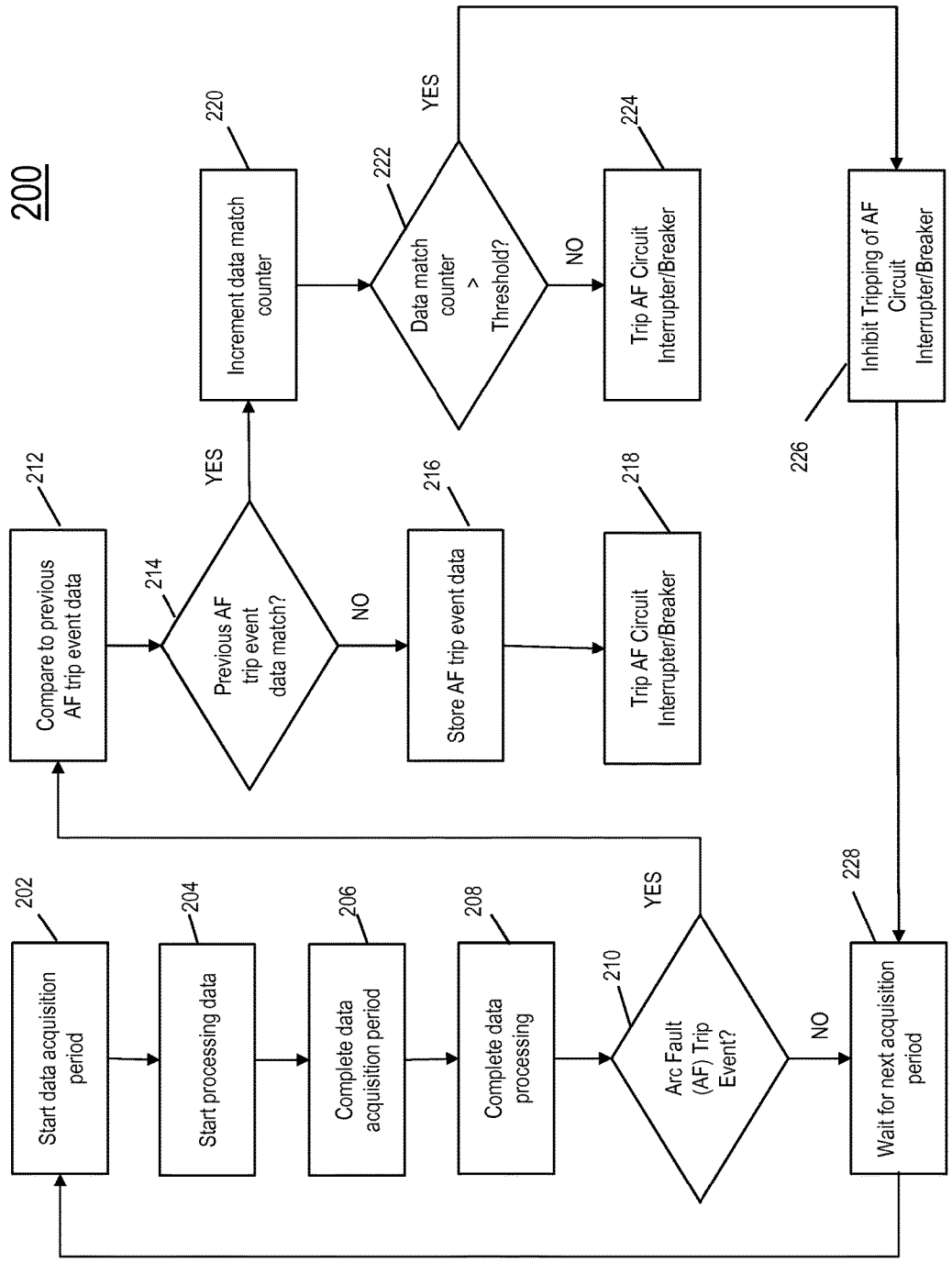
FIG. 2 is a flow diagram showing an exemplary process for implementing adaptive arc fault detection in accordance with an embodiment of the present disclosure.

FIG. 2 is a flow diagram showing an exemplary process 200 for implementing an adaptive arc fault detection in accordance with an embodiment. For the purpose of explanation, the process 200 is discussed with reference to the processor 110 and other components of the arc fault detection device 100 in FIG. 1.

At reference 202, the processor 110 commences a data acquisition period by sampling data relating to electrical characteristic parameters of a circuit being monitored through the sensors 102. The parameters may include a current, a voltage, high frequency content, and a change rate of the current. The data sampling can be conducted via an analog-to-digital converter (ADC) sampling of the current and voltage of the circuit being protected. The current and voltage may undergo conditioning prior to being sampled. The start of the acquisition period may be time-based, such as a half line cycle (120 Hz), or event-based.

At reference 204, the processor 110 begins processing the acquired data. Data processing can begin once data is available even though all the data has not yet been acquired. The data processing may include tracking minimum/maximum values, accumulation, counting for number of times a threshold is exceeded, and monitoring for frequency content.

At reference 206, the processor 110 finishes acquiring data at a completion of the data acquisition period. This marks the point when the last data is acquired before the processor 110 makes a determination on whether an arc fault tripping event has occurred. At reference 208, the processor 110 completes data processing of the acquired data.

At reference 210, the processor 110 determines whether an arc fault tripping event has occurred based on the acquired data relating to the electrical characteristic parameters of the monitored circuit. If the processor 110 determines that an arc fault tripping event has not occurred, the processor 110 waits for the next acquisition period at reference 228 and then starts a new acquisition period at reference 202.

Otherwise, if an arc fault tripping event has occurred, the processor 110 compares the newly detected arc fault tripping event to prior arc fault tripping events stored in the memory, at reference 212. Two arc fault tripping events match or are considered the same type of tripping event if they have one or more or a selected combination of sensed or calculated electrical characteristic parameters in common within a tolerance range or a standard of deviation, or in other words, if they have a common signature. The signature of a tripping event thus may be defined by a combination of sensed or calculated electrical characteristic parameters for the monitored circuit and is stored as signature data. At reference 214, the processor 110 determines whether the newly detected arc fault tripping event matches any prior detected tripping events stored in the memory.

In the event that the newly detected arc fault tripping event does not match any prior detected tripping events stored in the memory, the processor 110 stores event data for the newly detected arc fault tripping event in the memory, at reference 216. In this case, the data match counter is zero, which is reflected in the stored event data. Thereafter, at reference 218, the processor 110 allows the circuit interrupter 120 to interrupt current to the circuit 10.

If the newly detected arc fault tripping event matches a prior detected type of tripping event stored in the memory, the processor 110 increments a data match counter for the matched prior tripping event and updates this information in the memory at reference 220. Next, at reference 222, the processor 110 determines whether a threshold has been satisfied. For example, the processor 110 determines whether the data match counter number for the arc fault tripping event is equal or greater than the threshold, such as a number threshold (e.g., a number of event matches) or a frequency threshold (e.g., a number of event matches over time). The number threshold may be preset, e.g., at 3 or more data matches of the same type of tripping event. The processor 110 may also take into account a time interval between matched tripping events, as part of the threshold analyses.

Furthermore, the threshold may be varied according to a complexity of the arc fault detection algorithm, such as the complexity of the signature used to detect or define a tripping event. A complex signature is defined by more parameters, which makes it easier to distinguish between different types of tripping events. Thus, the threshold may be set at a smaller value when the detection algorithm employs a complex signature, and at a larger value when the detection algorithm employs a simpler signature. The size of the trip decision buffer also may vary directly with the threshold requirements. For example, the trip decision buffer may be smaller when the threshold has a smaller value, or vice-a-versa.

If the threshold is not satisfied at reference 222, the processor 110 does not consider the newly detected arc fault tripping event to be an unwanted tripping event as of yet, and allows the circuit interrupter 120 to interrupt current to the circuit 10, at reference 224. Otherwise if the threshold is satisfied at reference 222, the processor 110 identifies the newly detected arc fault tripping event as an unwanted tripping event. The processor 110 then inhibits tripping of the circuit interrupter 120, and thus, inhibits interruption of current to the circuit 10, at reference 226. Thereafter, the processor 110 proceeds to wait for the next acquisition period at reference 228.

Although the above process 200 updates the memory to reflect a number of times each type of arc fault tripping event has occurred, the filtering of unwanted tripping events may be implemented without storing this information for each type of tripping event. For example, as discussed immediately below with respect to FIG. 3, a newly detected arc fault tripping event may be compared to individual tripping events stored in the memory to ascertain a number of times a type of tripping event has occurred.

Figure 3:
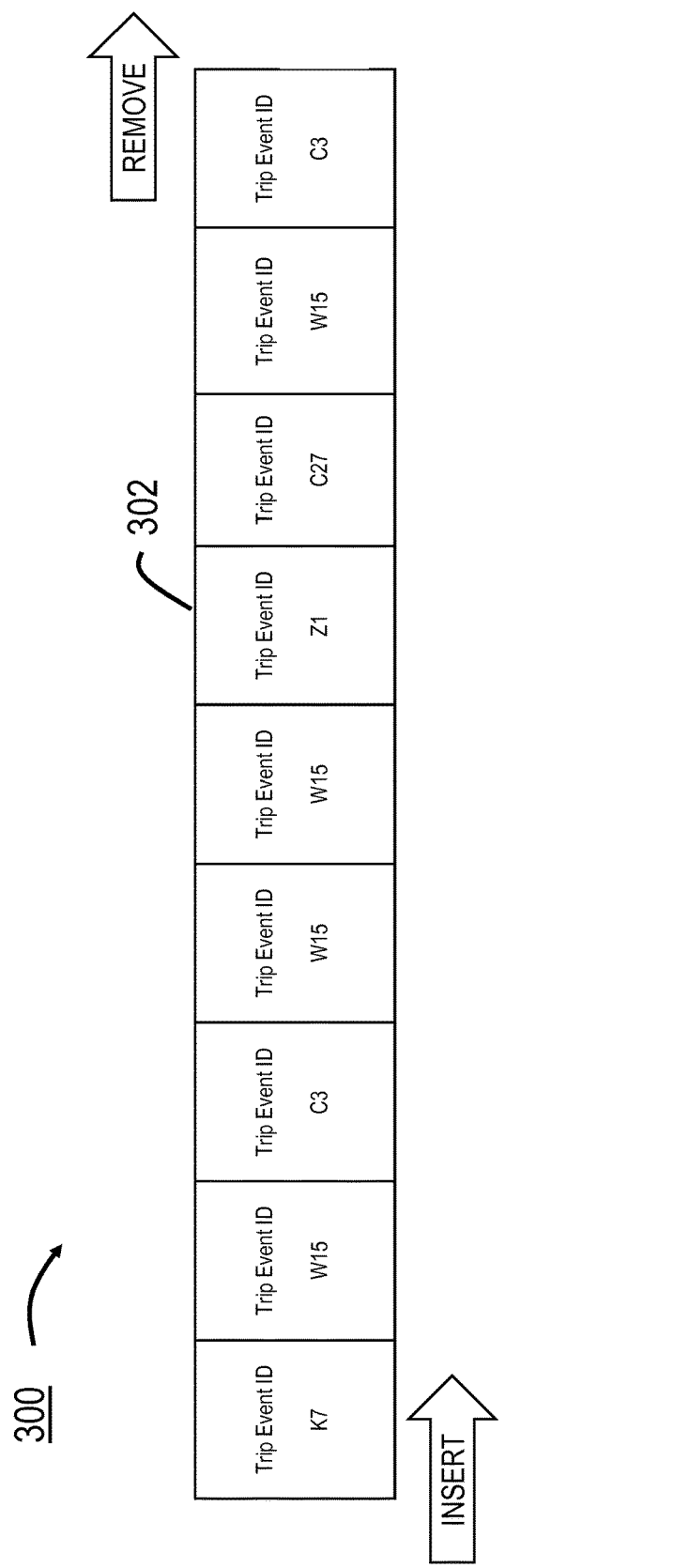
FIG. 3 is an exemplary data storage implementation for storing detected arc fault tripping events as single event items in accordance with an embodiment of the present disclosure.

FIG. 3 is an exemplary data storage implementation 300 for storing detected arc fault tripping events as single event items in accordance with an embodiment. As shown in this example, the data items stored in the memory are single event items 302 of detected arc fault tripping events. Each event item 302 corresponds to an individual detected arc fault tripping event (e.g., K7, W15, C3, Z1 and C27), and includes signature data of the event and can also include other information such as an event identifier and a time stamp of the event. The event items 302 are stored in a first-in-first-out (FIFO) manner, and identify the order in which the events occurred. The event items of tripping events also have a known lifespan in the memory, as controlled by storage space limitations (e.g., a predefined buffer size or a predefined limit on data items to be stored). In operation, when a new arc fault tripping event is detected, data of the tripping event is stored as a single event item in the memory. If the memory is full, an oldest stored event item in the memory is removed to enable storage of the newly detected tripping event.

Figure 4:
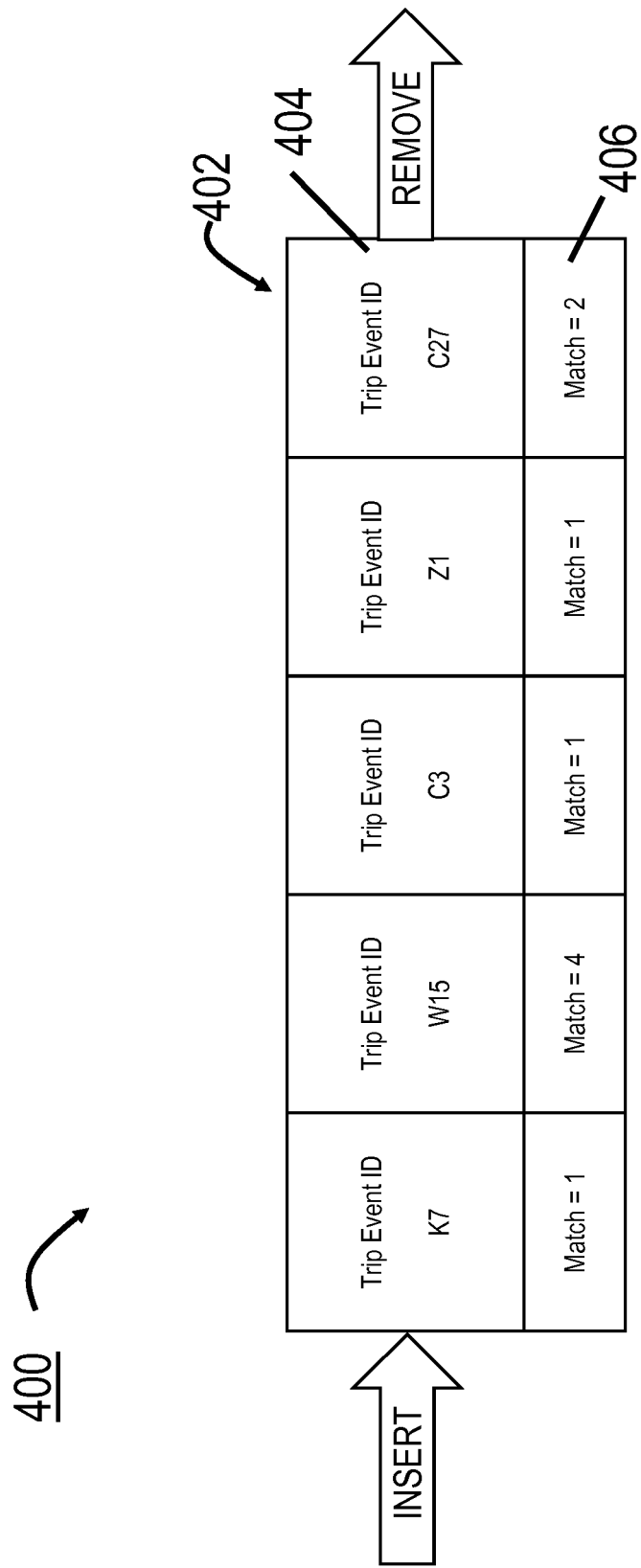
FIG. 4 is an exemplary data storage implementation for storing detected arc fault tripping events as match-event items in accordance with a further embodiment of the present disclosure.

FIG. 4 is an exemplary data storage implementation 400 for storing detected arc fault tripping events as match-event items in accordance with a further embodiment. As shown in this example, the data items stored in memory are match-event items 402 of detected arc fault tripping events (e.g., K7, W15, C3, Z1 and C27). Each match-event item 402 includes event data 404 such as signature data, a time stamp and an identifier, and match data 406 for storing a match variable identifying a number of times the event-type has occurred. The storage implementation of FIG. 4 stores a match variable which allows data for the same type of event to be aggregated. Thus, a smaller amount of memory can be used, and the number of matches needed to allow or inhibit tripping is independent of the memory size.

Figure 5:
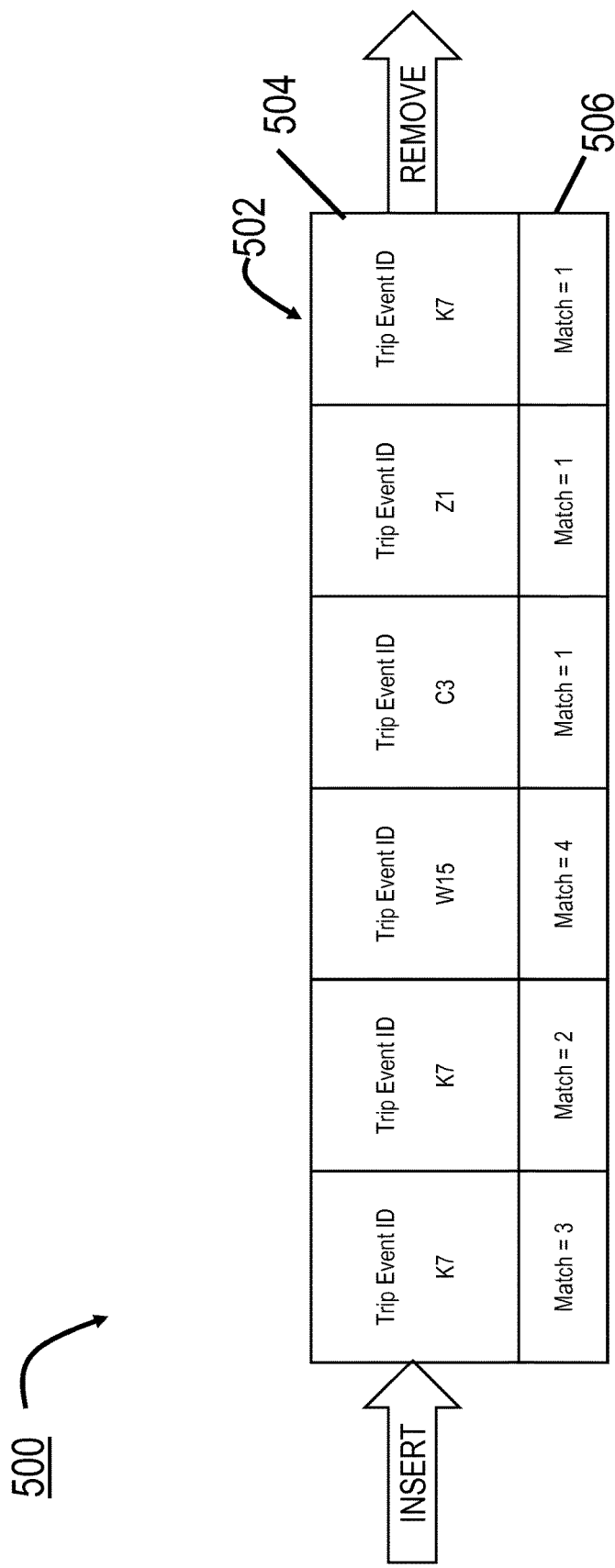
FIG. 5 is an exemplary hybrid data storage implementation for storing detected arc fault tripping events in accordance with another embodiment of the present disclosure.

FIG. 5 is an exemplary hybrid data storage implementation 500 for storing detected arc fault tripping events in accordance with another embodiment. As shown in this example, the data items stored in memory are hybrid match-event items 502 for detected arc fault tripping events (e.g., K7, W15, C3 and Z1). Similar to the implementation of FIG. 4, the match-event item 502 includes event data 504 such as signature data, a time stamp and an event identifier, and match data 506 for storing a match variable identifying a number of times the event-type has occurred. However, in the implementation of FIG. 5, if a match is detected, only the match variable of the new tripping event is incremented. For example, if an event K7 is detected again for a fourth time, a new event item for event K7 is stored with a match variable=3 and an older event item is removed from the memory. Furthermore, if the newly detected tripping event does not match any events in the memory, an event item for the new event is stored with a match variable=0.

The storage implementation of FIG. 5 shares the same benefits as previously discussed for the implementation of FIG. 4, and also allows the order of the events to be known.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. An adaptive arc fault detection device comprising:
   a memory configured to store data of one or more types of arc fault tripping events previously detected on a circuit over a period of time, each previously detected type of arc fault tripping event having resulted in the interruption of the circuit at least one time upon detection thereof; and
   a processor, in communication with the memory, the processor configured to:
      determine whether a newly detected arc fault tripping event is an unwanted tripping event based on a number of times a same type of arc fault tripping event, as the newly detected arc fault tripping event, has previously occurred according to the stored data in the memory, and
      inhibit interruption of the circuit if the newly detected arc fault tripping event is determined to be an unwanted tripping event.

2. The adaptive arc fault detection device according to claim 1, wherein the data stored in the memory includes a number of times a detected type of arc fault tripping event has occurred over a period of time.

3. The adaptive arc fault detection device according to claim 1, wherein the data stored in the memory includes sensed or calculated electrical characteristic parameters defining a signature of a detected arc fault tripping event.

4. The adaptive arc fault detection device according to claim 3, wherein two arc fault tripping events are the same type of tripping event if they have electrical characteristic parameters in common within a tolerance range.

5. The adaptive arc fault detection device according to claim 1, wherein the memory comprises a trip decision buffer configured to store data of a limited number of detected arc fault tripping events.

6. The adaptive arc fault detection device according to claim 5, wherein the trip decision buffer is a first-in-first-out (FIFO) buffer.

7. The adaptive arc fault detection device according to claim 5, wherein data stored in the memory for an oldest detected arc fault tripping event is deleted to enable storage of data for the newly detected arc fault tripping event if the buffer is full.

8. The adaptive arc fault detection device according to claim 1, wherein the processor compares a number of times the same type of arc fault tripping event, as the newly detected arc fault tripping event, has occurred to a threshold to determine whether the newly detected arc fault tripping event is an unwanted tripping event.

9. The adaptive arc fault detection device according to claim 1, wherein the processor allows interruption of the circuit if the newly detected arc fault tripping event is not an unwanted tripping event.

10. The adaptive arc fault detection device according to claim 1, wherein the processor further compares the newly detected arc fault tripping event to the arc fault tripping events stored in the memory, and if the newly detected arc fault tripping event matches one of the arc fault tripping events stored in the memory, the processor updates the data for the matched arc fault tripping event stored in the memory to reflect an additional occurrence of the event.

11. The adaptive arc fault detection device according to claim 1, further comprising:
a sensor for monitoring electrical characteristics of the circuit; and
a circuit interrupter for interrupting current to the circuit.

12. The adaptive arc fault detection device according to claim 1, wherein the processor further compares the newly detected arc fault tripping event to the arc fault tripping events stored in the memory, and if the newly detected arc fault tripping event does not match one of the arc fault tripping events stored in the memory, the processor updates the data in the memory to include the newly detected arc fault tripping event as a new type of arc fault tripping event and allows interruption of the circuit.

13. An adaptive arc fault detection method of filtering unwanted arc fault tripping events, the method comprising:
storing in a memory data of one or more types of arc fault tripping events previously detected on a circuit over a period of time, each previously detected type of arc fault tripping event having resulted in the interruption of the circuit at least one time upon detection thereof;
detecting a new arc fault tripping event on the circuit;
determining whether the new arc fault tripping event is an unwanted tripping event based on a number of times a same type of arc fault tripping event, as the new arc fault tripping event, has previously occurred according to the stored data in the memory, and
inhibiting interruption of the circuit if the new arc fault tripping event is determined to be an unwanted tripping event.

14. The adaptive arc fault detection method according to claim 13, wherein the data stored in the memory includes a number of times a detected type of arc fault tripping event has occurred over a period of time.

15. The adaptive arc fault detection method according to claim 13, wherein the data stored in the memory includes sensed or calculated electrical characteristic parameters defining a signature of a detected arc fault tripping event.

16. The adaptive arc fault detection method according to claim 15, wherein two arc fault tripping events are the same type of arc fault tripping event if they have electrical characteristic parameters in common within a tolerance range.

17. The adaptive arc fault detection method according to claim 13, wherein data for an oldest detected arc fault tripping event, stored in the memory, is deleted to enable storage of data for the newly detected arc fault tripping event if the memory is full.

18. The adaptive arc fault detection method according to claim 13, wherein determining comprises comparing a number of times the same type of arc fault tripping event, as the newly detected arc fault tripping event, has occurred to a threshold, and identifying the newly detected arc fault tripping event as an unwanted tripping event if the threshold is satisfied.

19. The adaptive arc fault detection method according to claim 13, further comprising: allowing interruption of the circuit if the newly detected arc fault tripping event is not an unwanted tripping event.

20. The adaptive arc fault detection method according to claim 13, further comprising:
comparing the newly detected arc fault tripping event to the arc fault tripping events stored in the memory; and
if the newly detected arc fault tripping event matches an arc fault tripping event stored in the memory, updating the data for the matched arc fault tripping event stored in the memory to reflect an additional occurrence of the event.

* * * * *